United States Patent
Matsubara et al.

(10) Patent No.: US 12,552,212 B2
(45) Date of Patent: Feb. 17, 2026

(54) SHOCK ABSORBER

(71) Applicant: KYB Motorcycle Suspension Co., Ltd., Gifu (JP)

(72) Inventors: Yuta Matsubara, Gifu (JP); Shohei Amada, Gifu (JP); Nobuhiro Noguchi, Gifu (JP)

(73) Assignee: KYB Motorcycle Suspension Co., Ltd., Gifu (JP)

( * ) Notice: Subject to any disclaimer, the term of this patent is extended or adjusted under 35 U.S.C. 154(b) by 448 days.

(21) Appl. No.: 18/269,687

(22) PCT Filed: Sep. 24, 2021

(86) PCT No.: PCT/JP2021/034935
§ 371 (c)(1),
(2) Date: Jun. 26, 2023

(87) PCT Pub. No.: WO2022/158046
PCT Pub. Date: Jul. 28, 2022

(65) Prior Publication Data
US 2024/0059116 A1 Feb. 22, 2024

(30) Foreign Application Priority Data
Jan. 19, 2021 (JP) .................. 2021-006165

(51) Int. Cl.
*B60G 15/02* (2006.01)

(52) U.S. Cl.
CPC ...... *B60G 15/02* (2013.01); *B60G 2204/1242* (2013.01); *B60G 2204/4232* (2013.01)

(58) Field of Classification Search
None
See application file for complete search history.

(56) References Cited

U.S. PATENT DOCUMENTS

| | | | |
|---|---|---|---|
| 6,155,545 A | 12/2000 | Noro et al. | |
| 2010/0252972 A1* | 10/2010 | Cox | F16F 1/121 267/286 |

(Continued)

FOREIGN PATENT DOCUMENTS

| | | | | |
|---|---|---|---|---|
| CN | 108386470 A | * | 8/2018 | ......... B60G 17/0165 |
| JP | H11-173367 A | | 6/1999 | |

(Continued)

OTHER PUBLICATIONS

CN-108386470-A: English Machine Translation (Year: 2018).*

(Continued)

*Primary Examiner* — Melanie Torres Williams
(74) *Attorney, Agent, or Firm* — Paratus Law Group, PLLC

(57) ABSTRACT

A shock absorber according to the present invention is configured to include: a shock absorber main body in which an outer tube and a rod axially movably inserted into the outer tube are included; a suspension spring formed of a coil spring disposed on the outer periphery of the shock absorber main body; a rod-side spring seat attached to the rod and supporting one end of the suspension spring; an annular tube-side spring seat screwed to a screw portion provided on the outer periphery of the outer tube and supporting the other end of the suspension spring; a slider to be placed on the outer periphery of the outer tube with only an axial movement is permitted; a connecting portion that detachably connects the tube-side spring seat to the slider; and a rotation regulating portion that regulates a rotation of the tube-side spring seat and the slider relative to each other about the axis of the outer tube in a state where the tube-side spring seat and the slider are connected to each other.

9 Claims, 7 Drawing Sheets

(56) References Cited

U.S. PATENT DOCUMENTS

2020/0324851 A1 10/2020 Hiramaru
2020/0377168 A1 12/2020 Kubotera

FOREIGN PATENT DOCUMENTS

| JP | 2007-071299 A | 3/2007 | |
|----|---------------|--------|---|
| JP | 2010-065719 A | 3/2010 | |
| JP | 2020-176637 A | 10/2020 | |
| WO | WO-2014080842 A1 * | 5/2014 | ......... B60G 17/0272 |
| WO | WO 2019/207710 A1 | 10/2019 | |

OTHER PUBLICATIONS

WO-2014080842-A1: English Machine Translation (Year: 2014).*
Feb. 13, 2024, Japanese Office Action issued for related JP Application No. 2021-006165.

* cited by examiner (a)

(b)

(a)

(b)

(c)

SHOCK ABSORBER

CROSS REFERENCE TO PRIOR APPLICATION

This application is a National Stage Patent Application of PCT International Patent Application No. PCT/JP2021/034935 (filed on Sep. 24, 2021) under 35 U.S.C. § 371, which claims priority to Japanese Patent Application No. 2021-006165 (filed on Jan. 19, 2021), which are all hereby incorporated by reference in their entirety.

TECHNICAL FIELD

The present invention relates to a shock absorber.

BACKGROUND ART

A shock absorber is used with being interposed between a vehicle body and a rear wheel of a vehicle in a straddle vehicle, for example, and reduces the vibrations of the vehicle body and the rear wheel with the aid of its damping force generated upon its extension and compression.

Specifically, the shock absorber includes a shock absorber main body that has an outer tube and a rod axially movably inserted into the outer tube and generates damping force to impede extension and contraction in the motion of its extension and compression, and the shock absorber further includes: a rod-side spring seat provided on the rod; a tube-side spring seat placed on the outer periphery of the outer tube; and a suspension spring interposed between the rod-side spring seat and the tube-side spring seat.

The shock absorber configured as described above elastically supports the vehicle body by the resilient force exerted by the suspension spring when the shock absorber is interposed between the vehicle body and the rear wheel of the straddle vehicle, and the shock absorber main body generates the damping force in the motion of extension and compression thereby enabling to reduce the vibrations of the vehicle body.

Furthermore, for example, as disclosed in WO 2019/207710 A, a structure used for the shock absorber includes a male screw portion on the outer periphery of an outer tube in order that vehicle height adjustment of the straddle vehicle is enabled, wherein a tube-side spring seat, which has an annular shape and includes a female screw on its inner periphery, is screwed to the male screw portion. Therefore, according to the conventional shock absorber, when the tube-side spring seat is rotated relative to the outer tube, the tube-side spring seat is moved relative to the outer tube in the axial direction, so that the position for supporting the suspension spring can be adjusted in the axial direction of the outer tube.

The shock absorber further includes a locknut which is, together with the tube-side spring seat, screwed to the male screw portion of the outer tube to regulate the rotation of the tube-side spring seat. Therefore, even when a torque is applied from the suspension spring that is stretched or compressed upon the motion of extension or compression of the shock absorber, the rotation of the tube-side spring seat is regulated by the aid of the locknut, and the shock absorber can keep the vehicle height constant.

CITATION LIST

Patent Literature

Patent Literature 1: WO 2019/207710 A

SUMMARY OF INVENTION

Technical Problem

According to the conventional shock absorber, when adjusting the vehicle height, a pair of dedicated tools is used to loosen the locknut and the locknut is moved apart from the tube-side spring seat, and then the tube-side spring seat is rotated relative to the outer tube thereby adjusting the axial position. Once the position of the tube-side spring seat is determined, the locknut is tightened toward the tube-side spring seat by manipulating the locknut with one of the dedicated tool while the tube-side spring seat being held with the other of the dedicated tool.

However, in a case where the dedicated tool is not at hand when adjusting the vehicle height, or in a case where it is desired to rapidly adjust the vehicle height in an emergency, operators sometimes loosen and tighten the locknut by hitting the rear end of the handle of a screw driver with a hammer while pressing the distal end of the screw driver against the grooves and ridges of the outer periphery of the locknut.

In the vehicle height adjustment with use of a screw driver and a hammer in this manner, the tube-side spring seat is rotated together with the locknut when tightening the locknut, whereby the position of the tube-side spring seat is shifted, consequently the vehicle height cannot be adjusted as intended.

As described above, a dedicated tool for vehicle height adjustment is need for the conventional shock absorber, and there is a problem in which the vehicle height is shifted from the intended height of the vehicle when a screw driver and a hammer are used to adjust the vehicle height in a quick fix.

Solution to Problem

Therefore, an object of the present invention is to provide a shock absorber with which a vehicle height can be adjusted as intended without using a tool.

In order to solve the above-mentioned problem, a shock absorber of the present invention is configured to include: a shock absorber main body in which an outer tube having a screw portion on its outer periphery and a rod to be inserted into the outer tube so as to be movable in the axial direction are included; a suspension spring formed of a coil spring disposed on the outer periphery of the shock absorber main body; a rod-side spring seat attached to the rod and supporting one end of the suspension spring; an annular tube-side spring seat screwed to the screw portion of the outer tube and supporting another end of the suspension spring; a slider to be placed on the outer periphery of the outer tube with only a movement in the axial direction is permitted; a connecting portion detachably connecting the tube-side spring seat to the slider; and a rotation regulating portion that regulates a rotation of the tube-side spring seat and the slider relative to each other about the axis of the outer tube in a state where the tube-side spring seat and the slider are connected to each other.

According to the shock absorber configured as described above, an operator can attach and detach the tube-side spring seat and the slider without using a tool, and once the tube-side spring seat is connected to the slider by the connecting portion, a rotation of the tube-side spring seat and the slider relative to each other is regulated by the rotation regulating portion, so that it is not necessary to apply a torque when fixing the tube-side spring seat to the outer tube.

DESCRIPTION OF EMBODIMENTS

First Embodiment

Figure 1:
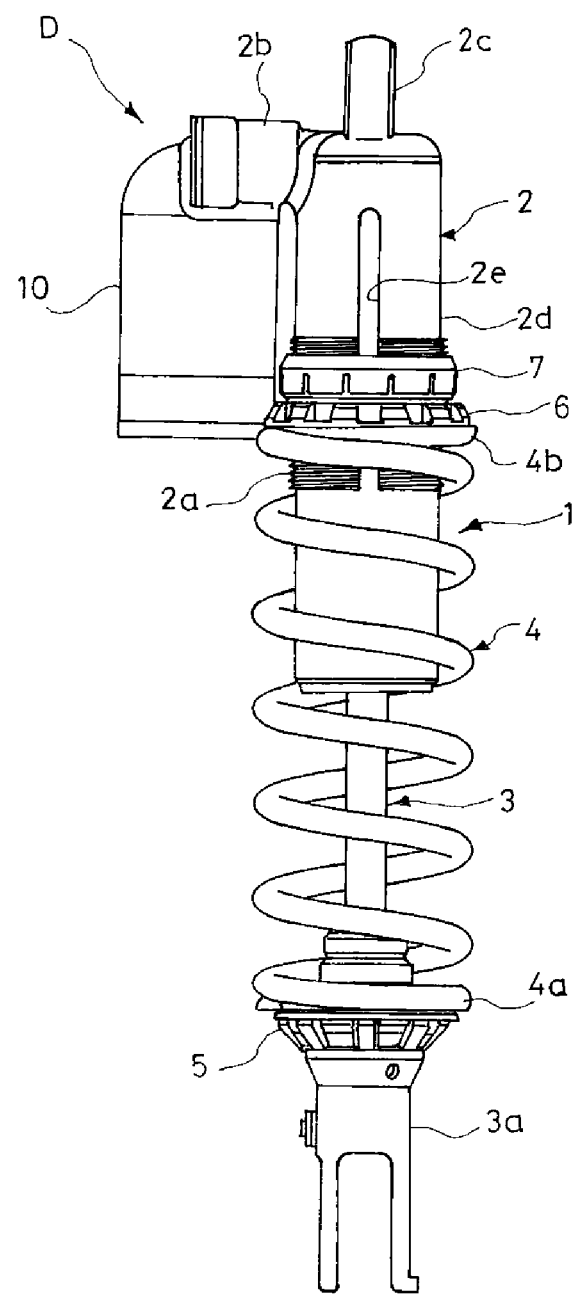
FIG. 1 is a side view of a shock absorber in a first embodiment.

Hereinafter, the present invention will be described on the basis of embodiments illustrated in the drawings. As illustrated in FIG. 1, the shock absorber D in the first embodiment is configured to include: a shock absorber main body 1 in which an outer tube 2 having a screw portion 2a on its outer periphery and a rod 3 to be inserted into the outer tube 2 so as to be movable in the axial direction are included; a suspension spring 4 formed of a coil spring disposed on the outer periphery of the shock absorber main body 1; a rod-side spring seat 5 attached to the rod 3 and supporting one end 4a of the suspension spring 4; an annular tube-side spring seat 6 screwed to the screw portion 2a of the outer tube 2 and supporting the other end 4b of the suspension spring 4; a slider 7 to be placed on the outer periphery of the outer tube 2 with only an axial movement is permitted; and a connecting portion detachably connecting the tube-side spring seat 6 to the slider 7, a rotation regulating portion that regulates a rotation of the tube-side spring seat 6 and the slider 7 relative to each other about the axis of the outer tube 2 in a state where the tube-side spring seat 6 and the slider 7 are connected to each other. In the case of the shock absorber D, the shock absorber D is used with being interposed between the vehicle body and the rear wheel in a straddle vehicle (not illustrated) and reduces the vibrations of the vehicle body and the rear wheels.

Various parts of the shock absorber D will be described in detail below. As illustrated in FIG. 1, the shock absorber main body 1 includes: a cylindrical outer tube 2; and a rod 3 to be inserted into the outer tube 2 so as to be movable in the axial direction, and generates damping force that impede the movement of the rod 3 relative to the outer tube 2 in the action of extension or compression when the rod 3 moves relative to the outer tube 2 in the axial direction thereby attenuating the vibrations of the vehicle body and the rear wheels of the straddle vehicle.

More specifically, although not illustrated, the shock absorber main body 1 includes: a cylindrical outer tube 2 whose upper end is closed; a rod 3 to be inserted into the outer tube 2 so as to be movable in the axial direction; a piston that is connected to the rod 3 and inserted into the outer tube 2 thereby compartmentalizing the inside of the outer tube 2 into an extension side chamber and a compression side chamber; a cylindrical tank 10 that is integrated with a hollow housing 2b provided on the upper end side of the outer tube 2, is disposed in parallel with the outer tube 2, and includes a gas chamber and a liquid chamber therein; and a valve case that is installed in the housing 2b thereby partitioning the compression side chamber and the liquid chamber. The extension side chamber and the compression side chamber are filled with a liquid such as hydraulic oil. A free piston is slidably inserted into the tank 10, and the tank 10 is compartmentalized into the liquid chamber and the gas chamber by the free piston. The liquid chamber in the tank 10 is filled with the same liquid as the liquid filled in the outer tube 2, and the gas chamber is filled with an inert gas such as nitrogen. Note that the liquid used for the shock absorber D may be, for example, a liquid such as water or an aqueous solution, besides the hydraulic oil, and regarding the gas used for the shock absorber D, a gas such as air other than an inert gas may also be used.

Moreover, the piston is provided with: a passage communicating the extension side chamber with the compression side chamber; and a piston valve to provide resistance to the flow of the fluid passing through the passage. Furthermore, the valve case is provided with: a base valve that allows only a flow of the liquid from the compression side chamber to the liquid chamber and offers resistance to the flow of the liquid; a variable valve that is arranged in parallel with the base valve to allow only a flow of the liquid from the compression side chamber to the liquid chamber and that can adjust the resistance offered to the flow of the liquid; and a check valve that allows only a flow of the liquid from the liquid chamber to the compression side chamber. In the shock absorber main body 1 configured as described above, the extension side chamber and the compression side chamber are extended or compressed by the piston in the movement of extension or compression, whereby damping force is generated by a pressure loss occurred when the liquid passes through the piston valve or the base valve. The damping force generated in the movement of extension or compression of the shock absorber main body 1 can be adjusted by adjusting the variable valve.

Note that the internal structure of the shock absorber main body 1 set forth is merely an example, and its design can be modified as long as the shock absorber main body 1 can generate damping force that impedes extension and compression in the movement of extension or compression of the shock absorber main body 1 in which the rod 3 moves relative to the outer tube 2 in the axial direction.

Next, the outer tube 2 includes at the top of its upper end a bracket 2c that can be connected to the vehicle body of a straddle vehicle. The rod 3 includes at its lower end a bracket 3a so as to be attached to a link connected to a swing arm swingably attached to a vehicle body of a straddle vehicle (not illustrated) and rotatably supporting a rear wheel. Therefore, the shock absorber D of the first embodiment is interposed between the vehicle body and the rear wheel in such a manner in which the outer tube 2 is connected to the vehicle body and the rod 3 is connected to the rear wheel.

The outer tube 2 includes a diameter enlarging portion 2d in which the upper side has a larger outer peripheral diameter than the lower side in FIG. 1 from partway therein, and also includes: a screw portion 2a formed of a male screw formed on the outer periphery of the diameter enlarging portion 2d from the lower end to the partway in the diameter enlarging portion 2d; and a pair of key grooves 2e arranged on the outer periphery of the diameter enlarging portion 2d with a phase difference of 180 degrees in the peripheral direction and formed along the axial direction from the lower end of the diameter enlarging portion 2d to the upward side of the screw portion 2a. Note that, two key grooves 2e are provided on the outer tube 2, however, the installed number of the key grooves 2e may be one or three or more.

A tube-side spring seat 6 having an annular shape is screwed to the screw portion 2a of the outer tube 2. A rod-side spring seat 5 having an annular shape is attached to the lower end side of the rod 3. A suspension spring 4 formed of a coil spring is interposed on the outer periphery of the shock absorber main body 1 between the rod-side spring seat 5 and the tube-side spring seat 6. That is, the outer tube 2 and the rod 3 of the shock absorber main body 1 are inserted into the suspension spring 4. The rod-side spring seat 5 supports a lower end serving as one end 4a of the suspension spring 4, the tube-side spring seat 6 supports an upper end serving as the other end 4b of the suspension spring 4, and the shock absorber main body 1 is biased to always extend by the resilient force of the suspension spring 4. Therefore, when the shock absorber D is interposed between the vehicle body and the rear wheel of the straddle vehicle, the vehicle body is elastically supported by the resilient force generated by the suspension spring 4. When the tube-side spring seat 6 is rotated relative to the outer tube 2 in the peripheral direction, the tube-side spring seat 6 moves relative to the outer tube 2 in the axial direction just like a feed screw, so that the position for supporting the other end 4b of the suspension spring 4 can be changed. Since the length of the suspension spring 4 under compression does not change if no change in the weight of the vehicle body supported by the suspension spring 4, by shifting the position in the tube-side spring seat 6 for supporting the other end 4b of the suspension spring 4, the distance between the tube-side spring seat 6 and the bracket 2c is changed, so that the height adjustment of the vehicle height can be made.

Figure 2:
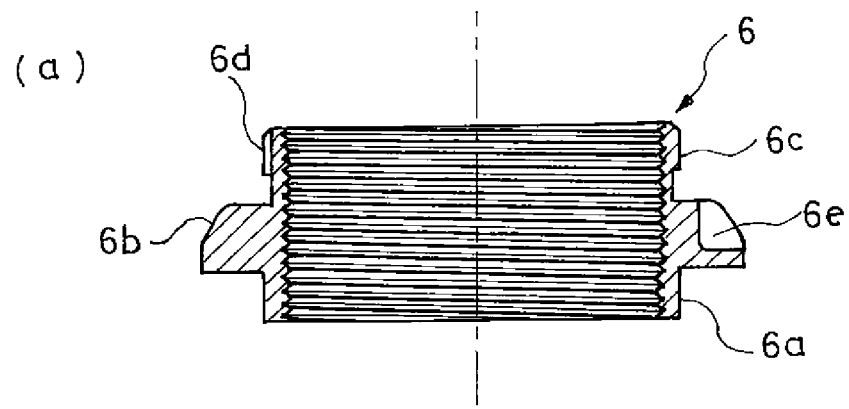
FIG. 2(a) is a cross-sectional view taken along line A-A of a tube-side spring seat of a shock absorber in a first embodiment.
FIG. 2(b) is a plan view of a tube-side spring seat of a shock absorber in a first embodiment.
Figure 2:
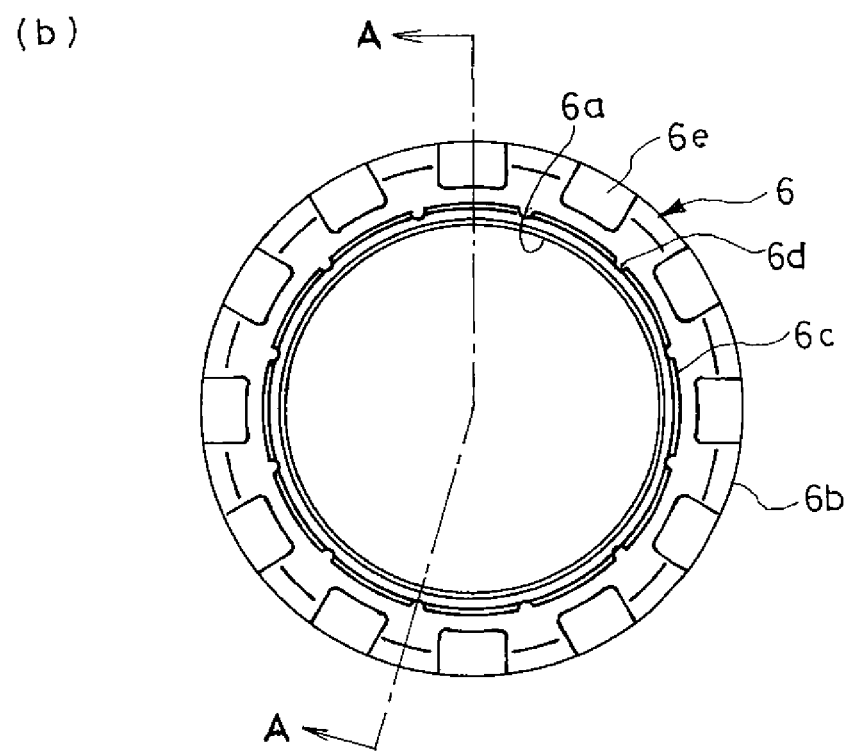

As illustrated in FIGS. 1 and 2, the tube-side spring seat 6 includes: a main body 6a having a female screw formed on the inner periphery; an annular flange 6b protruding outward from an axially intermediate portion of the outer periphery of the main body 6a; an annular convex portion 6c provided along the peripheral direction on the outer periphery of the upper end in FIG. 2(a) of the main body 6a; twelve grooves 6d provided at equal intervals in the peripheral direction on the outer periphery of the annular convex portion 6c and formed along the axial direction; and twelve concave portions 6e provided at equal intervals in the peripheral direction on the outer periphery of the flange 6b and arranged between the grooves 6d and 6d.

The tube-side spring seat 6 is made of a synthetic resin. In the shock absorber D of the first embodiment, the tube-side spring seat 6 is made of a glass fiber-reinforced polyamide resin having high strength so as to withstand a load applied from the suspension spring 4, contributing to weight reduction of the shock absorber D. Note that, the tube-side spring seat 6 can be made of a synthetic resin other than a glass fiber-reinforced synthetic resin as long as there is no problem with the strength, the tube-side spring seat 6 made of a synthetic resin can contribute to the weight reduction of the shock absorber D. Alternatively, the tube-side spring seat 6 may be made of a metal instead of a synthetic resin.

A portion of the main body 6a of the tube-side spring seat 6 below the flange 6b in FIG. 2(a), that is, a portion of the main body 6a on the opposite side across the flange 6b from the side provided with the annular convex portion 6c functions as a fitting portion to which the end turn portion provided at the other end 4b of the suspension spring 4 is fitted. Once the other end 4b of the suspension spring 4 is fitted to the fitting portion of the main body 6a, the end turn portion of the other end 4b of the suspension spring 4 abuts on the lower end of the flange 6b in FIG. 2(a), and the tube-side spring seat 6 bears the other end 4b of the suspension spring 4 at the flange 6b. Note that the concave portion 6e provided on the outer periphery of the flange 6b is provided on the upper end side of the flange 6b facing toward the annular convex portion 6c side in FIG. 2(a), and is not formed at the lower end of the flange 6b in FIG. 2(a), and the other end 4b of the suspension spring 4 can be stably supported by the lower end surface of the flange 6b having a flat surface.

A main body 6a having an outer diameter smaller than the outer diameters of the flange 6b and of the annular convex portion 6c is exposed between the flange 6b and the annular convex portion 6c. Therefore, it can also be said that the tube-side spring seat 6 includes an annular concave portion between the flange 6b and the annular convex portion 6c.

The tube-side spring seat 6 includes twelve grooves 6d at equal intervals with a phase difference of 30 degrees in the peripheral direction on the outer periphery of the annular convex portion 6c. Each groove 6d is formed along the axial direction over the entire length of the annular convex portion 6c. That is, the groove 6d is provided along the axial direction from the upper end to the lower end of the annular convex portion 6c in FIG. 2(a).

Figure 3:
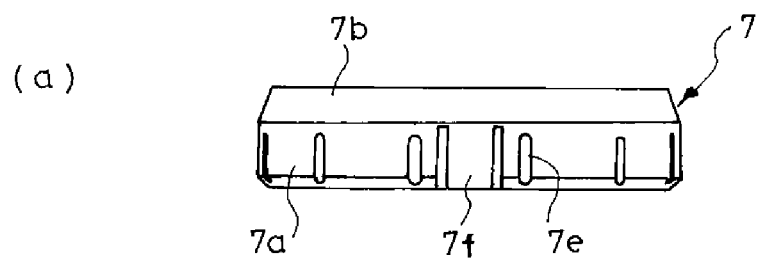
FIG. 3(a) is a side view of a slider of a shock absorber in a first embodiment.
FIG. 3(b) is a bottom view of a slider of a shock absorber in a first embodiment.
FIG. 3(c) is a cross-sectional view taken along line B-B of a slider of a shock absorber in a first embodiment.
Figure 3:
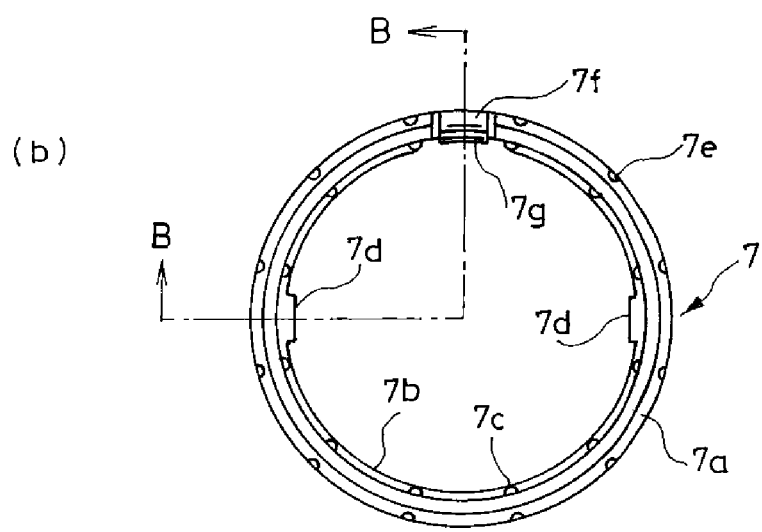
Figure 3:
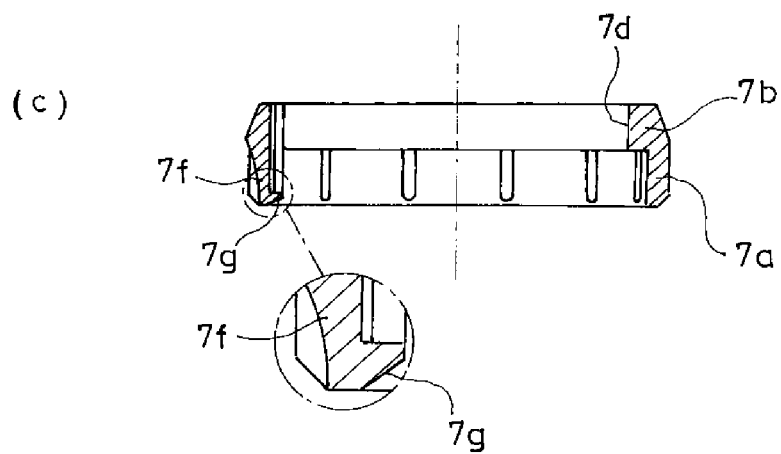

As shown in FIG. 3, the slider 7 has an annular shape and includes: an inner diameter large-diameter portion 7a that is formed in a C-shape with a split in a part thereof and has an inner periphery allowing the annular convex portion 6c of the tube-side spring seat 6 to fit therein; and an inner diameter small-diameter portion 7b whose inner peripheral diameter is smaller than that of the annular convex portion 6c.

The slider 7 is made of a synthetic resin. The slider 7 is not required to have a strength as high as that is required for the tube-side spring seat 6 directly subjected to a load from the suspension spring 4, and hence the use of a synthetic resin reinforced by glass fiber composite is not required. For this reason, in the shock absorber D of the first embodiment, the slider 7 is configured to be made of a polyacetal resin, but may be made of another synthetic resin. Note that, the slider 7 is made of a synthetic resin, and thus contributes to the weight reduction of the shock absorber D. Alternatively, the slider 7 may be made of a metal instead of a synthetic resin.

In addition, the slider 7 includes: twelve protrusions 7c arranged at equal intervals with a phase difference of 30 degrees in the peripheral direction on the inner periphery of the inner diameter large-diameter portion 7a to which the annular convex portion 6c is fitted, the protrusions 7c protruding inside the slider 7 and each to be fitted into each of the grooves 6d provided in the annular convex portion 6c; and keys 7d provided on the inner periphery of the inner diameter small-diameter portion 7b at positions corresponding to the two key grooves 2e of the outer tube 2, each of the keys 7d is to be inserted into each of the key grooves 2e.

The slider 7 is placed on the outer periphery of the outer tube 2 by inserting the outer tube 2 into the inner periphery from the lower end side of the outer tube 2 in FIG. 1 while circumferentially aligning the position of the key 7d on the inner periphery with the position of the key groove 2e provided on the outer periphery of the outer tube 2. Once the key 7d is fitted into the key groove 2e, the side walls of the key 7d are slidably in contact with both side walls of the key groove 2e, and the movement of the slider 7 in the peripheral direction of the outer tube 2 is regulated, but the movement of the slider 7 in the axial direction along the key groove 2e of the outer tube 2 is permitted. Therefore, the slider 7 is placed on the outer periphery of the outer tube 2 by the key 7d and the key groove 2e in a state where only the movement in the axial direction is permitted. Note that, the prevention of the rotation and the permission of the axial movement of the slider 7 relative to the outer tube 2 are realized by the key 7d and the key groove 2e, but may be realized by other structures. Therefore, for example, the outer peripheral shape of the outer tube 2 may be made to be a shape obtained by linearly cutting off a part of a circle, such that the inner peripheral shape of the slider 7 is a shape matching the outer peripheral shape of the outer tube 2, thereby realizing the prevention of the rotation and the permission of the axial movement of the slider 7 relative to the outer tube 2.

After the slider 7 is placed on the outer tube 2 in this manner, the tube-side spring seat 6 is screwed to the screw portion 2a of the outer tube 2 by inserting the outer tube 2 into the inner periphery from the lower end side of the outer tube 2 in FIG. 1. In a state where the tube-side spring seat 6 is screwed to the screw portion 2a, the slider 7 cannot move to the opposite side of the tube-side spring seat 6 across the tube-side spring seat 6 and the key groove 2e is formed only partway in the outer tube 2, so that the slider 7 does not fall off from the outer tube 2.

Next, the protrusions 7c are formed along the axial direction over the entire length of the inner diameter large-diameter portion 7a each at a position on the inner periphery of the inner diameter large-diameter portion 7a facing the grooves 6d so each of the protrusions 7c as to be fitted into each of the grooves 6d of the annular convex portion 6c in a state where the annular convex portion 6c of the tube-side spring seat 6 is fitted into the inner diameter large-diameter portion 7a of the slider 7. That is, the protrusions 7c each are provided at equal intervals with a phase difference of 30 degrees in the peripheral direction on the inner periphery of the inner diameter large-diameter portion 7a, and the protrusions 7c each are provided along the axial direction from the upper end to the lower end of the inner diameter large-diameter portion 7a in FIG. 3(a). Therefore, once the annular convex portion 6c is fitted into the inner diameter large-diameter portion 7a of the slider 7 from the axial direction while circumferentially aligning the position of the protrusion 7c so as to match the position of the groove 6d, the protrusion 7c enters into the groove 6d. Once the protrusion 7c is fitted into the groove 6d and the annular convex portion 6c of the tube-side spring seat 6 is fitted into the slider 7 in this manner, the rotation of the slider 7 and the tube-side spring seat 6 relative to each other in the peripheral direction is regulated.

Here, as stated previously, the rotation of the slider 7 relative to the outer tube 2 in the peripheral direction is regulated, and the tube-side spring seat 6 fitted to the slider 7 is regulated from rotating relative to the slider 7. For this reason, once the tube-side spring seat 6 is fitted to the slider 7 placed on the outer tube 2, the tube-side spring seat 6 is regulated from rotating relative to the outer tube 2 in the peripheral direction.

Note that, in the shock absorber D of the first embodiment, the slider-side facing portion of the slider 7 that faces the tube-side spring seat 6 is configured as the inner peripheral portion of the inner diameter large-diameter portion 7a, and the spring seat-side facing portion of the tube-side spring seat 6 that faces the slider 7 is configured as the annular convex portion 6c.

Moreover, in the shock absorber D of the first embodiment, the rotation regulating portion is configured with: grooves 6d each provided in the annular convex portion 6c, which is a spring seat-side facing portion; and protrusions 7c provided in the inner diameter large-diameter portion 7a, which is a slider-side facing portion. According to the shock absorber D of the first embodiment, when the annular convex portion 6c of the tube-side spring seat 6 is pulled out from the slider 7, and then one protrusion 7c is fitted into one groove 6d in which another protrusion 7c has been fitted, and the annular convex portion 6c is fitted into the slider 7 again, the position of the slider 7 and the tube-side spring seat 6 relative to each other in the peripheral direction can be changed in a state where the rotation of the slider 7 and the tube-side spring seat 6 relative to each other is regulated. In this example, since twelve grooves 6d and twelve protrusions 7c are provided, the tube-side spring seat 6 can be positioned in a state where the rotation is regulated to twelve relative positions that are different from each other by 30 degrees in the peripheral direction relative to the slider 7. Note that the number of protrusions 7c installed may be any number equal to or less than the installed number of grooves 6d as long as the protrusions 7c provided on the slider 7 side are provided at positions capable of fitting into the grooves 6d, and the annular convex portions 6c can be inserted into and pull out from the inner diameter large-diameter portion 7a of the slider 7 by moving the tube-side spring seat 6 and the slider 7 relative to each other in the axial direction of the outer tube 2. However, since the rotation regulating portion is configured with the groove 6d and the protrusion 7c, it is preferable that the grooves 6d and the protrusions 7c are provided in the same number in regulating the rotation of the slider 7 and the tube-side spring seat 6 relative to each other in the peripheral direction in view of enhancing the strength of the rotation regulating portion against a torque for rotating the slider 7 and the tube-side spring seat 6 relative to each other.

The slider 7 also includes twelve marking grooves 7e each formed along the axial direction on the outer periphery of the inner diameter large-diameter portion 7a at a position facing the protrusion 7c in the radial direction. That is, when viewing the slider 7 from the axial direction, the marking grooves 7e each are provided at a position where the outer periphery of the inner diameter large-diameter portion 7a meets an extension line connecting the center point (not illustrated) of the circular inner diameter large-diameter portion 7a to each of the protrusions 7c. Therefore, an operator adjusting the vehicle height of a straddle vehicle can visually recognize the marking groove 7e when observing the slider 7. Since the protrusion 7c is positioned directly behind the marking groove 7e of the inner diameter large-diameter portion 7a, the operator can align the position of the marking groove 7e with the position of the groove 6d of the annular convex portion 6c in the peripheral direction while observing the positions thereof in order to fit the tube-side spring seat 6 pulled out from the slider 7 into the slider 7 again. The operator can easily fit the protrusion 7c, which cannot be visually recognized from the radically outer side of the slider 7, into the groove 6d thereby fitting the tube-side spring seat 6 into the slider 7. Note that, according to the shock absorber of the first embodiment, the mark is configured as the marking groove 7e, but the mark may be formed by a protrusion or another shape, or may be formed by painting as long as the operator can visually recognize it.

The slider 7 further includes: an elastic piece 7f that extends from the lower end of the inner diameter small-diameter portion 7b in FIG. 3(a) and is to be accommodated in the split of the inner diameter large-diameter portion 7a; and a claw 7g provided on the distal end side of the elastic piece 7f at the inner peripheral side of the slider 7.

The base end of the elastic piece 7f is continuous with the inner diameter small-diameter portion 7b, and the distal end side of the elastic piece 7f is allowed to elastically deform as a free end to flex in the radial direction of the slider 7 with the base end side serving as a fixed end. As illustrated in FIG. 3(c), the inner peripheral side surface of the elastic piece 7f is flush with the inner peripheral surface of the inner diameter large-diameter portion 7a. The claw 7g protrudes from the elastic piece 7f inside the slider 7, and as illustrated in FIG. 3, the distal end of the claw 7g protrudes inside the slider 7 than the inner periphery of the inner diameter large-diameter portion 7a when the elastic piece 7f is not flexed as viewing the slider 7 from the axial direction. At the lower end of the claw 7g, there is provided a tapered surface inclined so as to taper off toward the distal end side.

Therefore, when inserting the annular convex portion 6c of the tube-side spring seat 6 into the inner diameter large-diameter portion 7a of the slider 7, first, the outer periphery of the distal end of the annular convex portion 6c comes into contact with the tapered surface of the claw 7g. In this state, when the tube-side spring seat 6 is moved into the axial direction toward the slider 7, the claw 7g is pushed and the elastic piece 7f flexes outward the slider 7, and the claw 7g pushes the annular convex portion 6c aside to allow the entry of the annular convex portion 6c into the inner diameter large-diameter portion 7a. When the tube-side spring seat 6 is further moved toward the slider 7 thereby allowing the entry of the annular convex portion 6c into the inner diameter large-diameter portion 7a, then the claw 7g eventually passes through the annular convex portion 6c, and the elastic piece 7f returns to the original unflexed state by its own restoring force, so that the claw 7g enters into the annular concave portion between the annular convex portion 6c and the flange 6b. In this state, the claw 7g abuts on the end surface of the annular convex portion 6c facing toward the flange 6b side thereby preventing the tube-side spring seat 6 from coming off from the slider 7 and maintaining a state where the slider 7 and the tube-side spring seat 6 are connected to each other. The slider 7 in the shock absorber D of the first embodiment is suitable to include the elastic piece 7f since it is formed of a polyacetal resin having high elasticity and elastic recovery rate.

Once the slider 7 is connected to the tube-side spring seat 6, the rotation of the tube-side spring seat 6 is regulated relative to the slider 7 whose rotation relative to the outer tube 2 is regulated by the aid of the groove 6d and the protrusion 7c, so that the circumferential rotation of the tube-side spring seat 6 relative to the outer tube 2 is regulated. Therefore, even if the tube-side spring seat 6 experiences a torque from the suspension spring 4 in the motion of extension or compression of the suspension spring 4, the tube-side spring seat 6 does not rotate relative to the outer tube 2 in a state where the tube-side spring seat 6 and the slider 7 are connected to each other, and thus the tube-side spring seat 6 does not move relative to the outer tube 2 in the axial direction.

As described above, in the shock absorber D of the first embodiment, the connecting portion is a snap-fit configured to include: the annular convex portion 6c provided on the outer periphery of the tube-side spring seat 6 along the peripheral direction; the elastic piece 7f extending from the slider 7; and the claw 7g provided on the distal end side of the elastic piece 7f and to be caught in the annular convex portion 6c, and the snap-fit detachably connects the slider 7 to the tube-side spring seat 6. Note that the connecting portion may be configured by providing an elastic piece and a claw to the tube-side spring seat 6, and by providing an annular convex portion to the slider 7. In this way, in a case where the connecting portion is configured as a snap-fit, the operator can easily pull out the tube-side spring seat 6 from the slider 7 by pushing the claw 7g outward with a finger to separate the claw 7g away from the annular convex portion 6c thereby uncoupling the slider 7 from the tube-side spring seat 6. In fitting the tube-side spring seat 6 into the slider 7, no need to manipulate the snap fit as a connecting portion in particular, and the tube-side spring seat 6 can be easily connected to the slider 7 just by inserting the tube-side spring seat 6 into the slider 7 until the claw 7g is caught in the annular convex portion 6c. Note that the connecting portion may be configured as a toggle latch, a fastener or the like that is generally used for a water bottle, or a bag, other than a snap-fitting, as long as the slider 7 and the tube-side spring seat 6 can be connected to each other and disconnected from each other, that is, they can be attached and detached without using a tool and without the rotation of the slider 7 and the tube-side spring seat 6 relative to each other.

The shock absorber D is configured as described above, and when the shock absorber D is interposed between the vehicle body and the rear wheel of a straddle vehicle, as stated previously, the shock absorber D elastically supports the vehicle body by the virtue of the resilient force of the suspension spring 4 thereby reducing the transmission of vibrations input from the rear wheel side to the vehicle body in the traveling of the straddle vehicle, and attenuating the vibration of the vehicle body by the virtue of the damping force generated by the shock absorber main body 1, so that the vibration of the vehicle body is reduced.

According to this the shock absorber D, the operator can adjust the vehicle height, which is the height of the vehicle body of the straddle vehicle, by the following procedure. First, from the state where the inner diameter large-diameter portion 7a of the slider 7 and the annular convex portion 6c of the tube-side spring seat 6 are fitted and connected to each other by the aid of the snap fit as a connecting portion, the operator grips the tube-side spring seat 6 with one hand, while gripping the slider 7 with the other hand, and pushes the slider 7 upward relative to the outer tube 2 in FIG. 1 with pushing the claw 7g outward to separate the claw 7g away from the annular convex portion 6c. Hereupon, the tube-side spring seat 6 can be pulled out from the slider 7, and the tube-side spring seat 6 is brought into a state in which the tube-side spring seat 6 is rotatable relative to the outer tube 2 in the peripheral direction.

Next, the operator grips the tube-side spring seat 6 and rotates the tube-side spring seat 6 relative to the outer tube 2 in a desired direction in the peripheral direction thereby moving the tube-side spring seat 6 relative to the outer tube 2 in the axial direction just like a feed screw, and once the tube-side spring seat 6 can be arranged at a desired position, the operator stops the rotation of the tube-side spring seat 6.

Furthermore, in a case where the marking groove 7e on the outer periphery of the slider 7 and the groove 6d of the tube-side spring seat 6 are not at the same position in the peripheral direction, the operator rotates the tube-side spring seat 6 to finely adjust the position of the groove 6d thereby aligning the marking groove 7e and the groove 6d to the same position in the peripheral direction.

Thereafter, in this state, the operator moves the slider 7 downward relative to the tube-side spring seat 6 in FIG. 1 and inserts the annular convex portion 6c into the inner diameter large-diameter portion 7a until the claw 7g is caught on the face of the annular convex portion 6c facing toward the flange 6b side, thereby connecting the slider 7 to the tube-side spring seat 6.

Hereupon, the protrusion 7c of the slider 7 is fitted into the groove 6d of the tube-side spring seat 6, and thus the tube-side spring seat 6 is connected to the slider 7 so as not to be circumferentially rotatable relative to the slider 7 whose circumferential rotation relative to the outer tube 2 is regulated. Therefore, once the tube-side spring seat 6 is connected to the slider 7 in this manner, the circumferential rotation of the tube-side spring seat 6 relative to the outer tube 2 is regulated, and hence the tube-side spring seat 6 is fixed to the outer tube 2 in a state of not movable in the axial direction. Note that since the outer periphery of the flange 6b of the tube-side spring seat 6 is provided with the concave portions 6e side by side in the peripheral direction, and the outer periphery of the slider 7 is provided with the marking grooves 7e, and hence, when the operator grips the tube-side spring seat 6 and the slider 7, the concave portions 6e and the marking grooves 7e play a role of slip prevention, thereby alleviating the burden imposed on the operator who is adjusting the height of the vehicle.

In this manner, the operator can separate the slider 7 from the tube-side spring seat 6 without using tools and rotates the tube-side spring seat 6 to adjust the position of the tube-side spring seat 6 relative to the outer tube 2 in the axial direction, and then can connect the slider 7 to the tube-side spring seat 6 without using tools. In addition, the operator is not required to perform such an operation of tightening a locknut using a screw driver and a hammer to apply a torque to the tube-side spring seat 6, and hence there will also be solved a problem in which the tube-side spring seat 6 is unintentionally rotated during fixing the tube-side spring seat 6 to the outer tube 2 and the vehicle height cannot be adjusted as intended.

As described above, the shock absorber D of the first embodiment is configured to include: the shock absorber main body 1 in which an outer tube 2 having a screw portion 2a on its outer periphery and a rod 3 to be inserted into the outer tube 2 so as to be movable in the axial direction are included; the suspension spring 4 which is formed of a coil spring disposed on the outer periphery of the shock absorber main body 1; the rod-side spring seat 5 which is attached to the rod 3 and supports the one end 4a of the suspension spring 4; the annular tube-side spring seat 6 which is screwed to the screw portion 2a of the outer tube 2 and supports the other end 4b of the suspension spring 4; the slider 7 which is to be placed on the outer periphery of the outer tube 2 with only an axial movement is permitted; the connecting portion (the annular convex portion 6c, the elastic piece 7f, and the claw 7g) which detachably connects the tube-side spring seat 6 to the slider 7; and the rotation regulating portion (the groove 6d and the protrusion 7c) which regulates a rotation of the tube-side spring seat 6 and the slider 7 relative to each other about the axis of the outer tube 2 in a state where the tube-side spring seat 6 and the slider 7 are connected to each other.

According to the shock absorber D configured as described above, the operator can attach and detach the tube-side spring seat 6 and the slider 7 without using a tool, and once the tube-side spring seat 6 is connected to the slider 7 by the connecting portion, the rotation of the tube-side spring seat 6 and the slider 7 relative to each other is regulated by the rotation regulating portion, so that there is no need to apply a torque in order to fix the tube-side spring seat 6 to the outer tube 2. Therefore, according to the shock absorber D configured as described above, the vehicle height of a straddle vehicle can be adjusted as intended by the operator without using tools.

It should be noted that the requirements of the slider 7 are that it needs to be placed in such a manner that its rotation relative to the outer tube 2 is regulated and its movement is permitted only in the axial direction, that it can be connected to the tube-side spring seat 6 by the connecting portion, and that the rotation of the tube-side spring seat 6 and the outer tube 2 relative to each other about the axis can be regulated by the rotation regulating portion. Hence, the slider 7 is configured to have an annular shape in the first embodiment, but is not needed to have an annular shape.

In addition, in the shock absorber D of the first embodiment, the tube-side spring seat 6 includes the annular convex portion (spring seat-side facing portion) 6c having an annular shape and facing the slider 7 in a state where the tube-side spring seat 6 and the slider 7 are connected to each other, the slider 7 has an annular shape and includes the inner diameter large-diameter portion (slider-side facing portion) 7a having an annular shape and facing the tube-side spring seat 6 in a state of being connected to the tube-side spring seat 6, and the rotation regulating portion includes: a plurality of grooves 6d provided at equal intervals in the peripheral direction on the annular convex portion (spring seat-side facing portion) 6c; and protrusions 7c provided on the inner diameter large-diameter portion (slider-side facing portion) 7a, the number of the protrusions 7c being less than or equal to the number of grooves 6d fitted to the grooves 6d. According to the shock absorber D configured as described above, since the plurality of grooves 6d is provided, by shifting the protrusion 7c to be fitted into the groove 6d, the position of the tube-side spring seat 6 relative to the slider 7 in the peripheral direction can be shifted in accordance with the installed number of grooves 6d. Therefore, according to the shock absorber D configured as described above, since the tube-side spring seat 6 can be positioned at a plurality of positions relative to the outer tube 2 in the peripheral direction, the vehicle height can be easily adjusted in multiple stages.

Note that, according to the shock absorber D of the first embodiment, the outer periphery of the annular convex portion 6c in the tube-side spring seat 6 is configured as the spring seat-side facing portion, and the inner periphery of the inner diameter large-diameter portion 7a in the slider 7 is configured as the slider-side facing portion, however, the slider-side facing portion and the spring seat-side facing portion are not limited to the above-mentioned combination. Therefore, for example, the upper end surface of the annular convex portion 6c of the tube-side spring seat 6 in FIG. 2 (a) may be configured as the spring seat-side facing portion, and a step portion at the boundary between the inner diameter large-diameter portion 7a and the inner diameter small-diameter portion 7b of the slider 7 may be configured as the slider-side facing portion. That is, in an aspect in which the tube-side spring seat 6 can be separated from the slider 7 by moving relative to each other in the axial direction of the outer tube 2, and in a case where there is a plurality of portions where the tube-side spring seat 6 and the slider 7 face each other, any portions out of the said portions can be chosen to be set as the slider-side facing portion and the spring seat-side facing portion.

Although the tube-side spring seat 6 is fitted into the inner periphery of the slider 7, there may be adopted a structure in which a part of the slider 7 is fitted into the tube-side spring seat 6. Furthermore, since one of the slider-side facing portion and the spring seat-side facing portion is needed to be provided with a groove, and the other to be provided with a protrusion, it may be configured that the annular convex portion (spring seat-side facing portion) 6c is provided with a protrusion, and the inner diameter large-diameter portion (slider-side facing portion) 7a is provided with a plurality of grooves.

Furthermore, in the shock absorber D of the first embodiment, the slider 7 has an annular shape, and the connecting portion includes: the annular convex portion 6c provided along the peripheral direction on the outer periphery of the tube-side spring seat 6; the elastic piece 7f extending from the slider 7; and the claw 7g provided on the distal end side of the elastic piece 7f and to be caught in the annular convex portion 6c. According to the shock absorber D configured as described above, when detaching the tube-side spring seat 6 from the slider 7, the operator can push the claw 7g outward to separate the tube-side spring seat 6 away from the slider 7, and once the tube-side spring seat 6 is fitted to the slider 7, the claw 7g is caught in the annular convex portion 6c by the restoring force of the elastic piece 7f, and the tube-side spring seat 6 and the slider 7 can be connected to each other. Therefore, according to the shock absorber D configured as described above, the operation of attaching and detaching of the tube-side spring seat 6 and the slider 7 becomes quite simple. Note that, in the shock absorber D of the first embodiment, the inner diameter large-diameter portion 7a is configured to have a C-shape with a split, and the elastic piece 7f is accommodated in the split of the inner diameter large-diameter portion 7a, and hence, the elastic piece 7f can be protected from an incoming flying stone and the like, and the tube-side spring seat 6 and the slider 7 can be prevented from being uncoupled.

Moreover, according to the shock absorber D of the first embodiment, the slider 7 can be engaged with the outer periphery of the tube-side spring seat 6, and the slider 7 is provided with the marking grooves (marks) 7e on the outer periphery at the same positions as those of the protrusions 7c formed on itself in the peripheral direction. According to the shock absorber D configured as described above, when fitting the tube-side spring seat 6 into the slider 7, the groove 6d of the annular convex portion 6c is aligned with the marking groove (mark) 7e at the same position in the peripheral direction, whereby the protrusion 7c and the groove 6d whose positions being out of the sight of the operator can be easily aligned in the peripheral direction, and the fitting operation of the tube-side spring seat 6 into the slider 7 by the operator becomes very simple. Note that, as stated previously, since it is also possible to adopt a structure in which the slider 7 is fitted into the tube-side spring seat 6, in such a case, a mark is required to be provided on the outer periphery of the tube-side spring seat 6.

Furthermore, in the shock absorber D of the first embodiment, the tube-side spring seat 6 and the slider 7 each are configured to be made of a synthetic resin, so that the weight reduction of the shock absorber D can be made. Note that, even either the tube-side spring seat 6 or the slider 7 is made of a synthetic resin, it is possible to contribute to the weight reduction of the shock absorber D.

Second Embodiment

Next, a shock absorber D1 of a second embodiment will be described. In the shock absorber D1 of the second embodiment, the same members as those of the shock absorber D of the first embodiment will be provided with the same reference numerals, and detailed description thereof will be omitted since the description will be redundant, and members different from those of the shock absorber D of the first embodiment will be described in detail.

Figure 4:
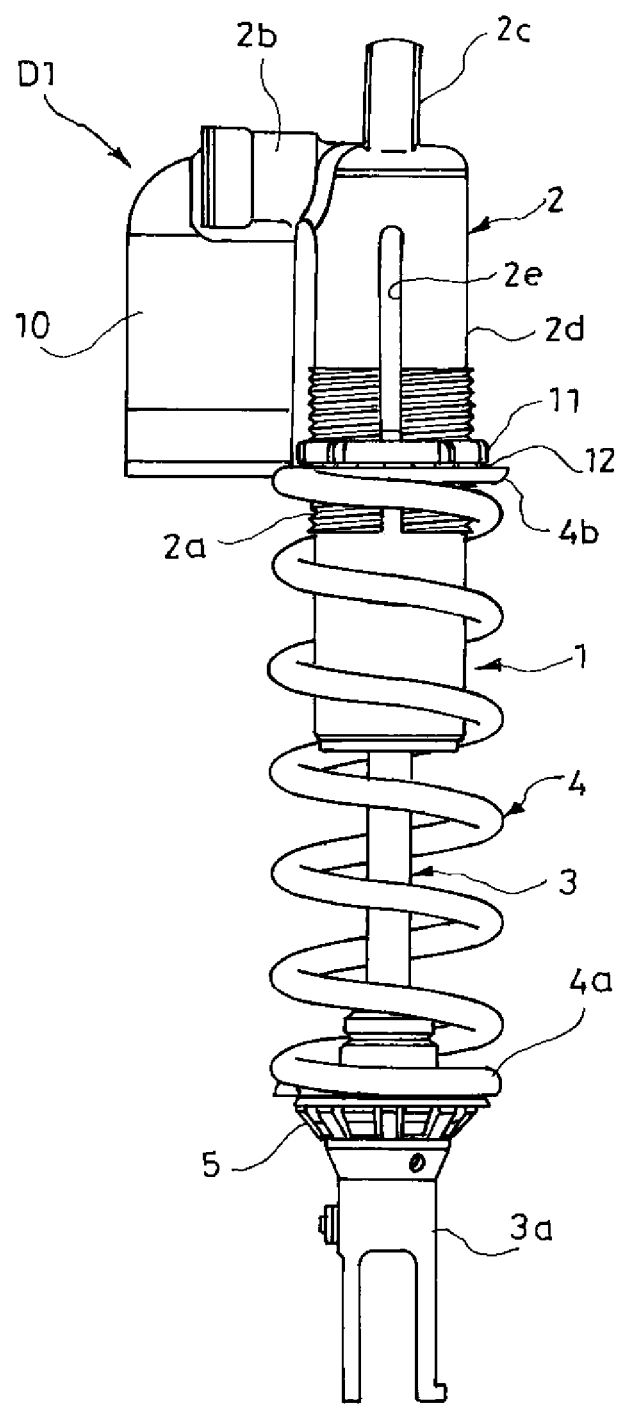
FIG. 4 is a side view of a shock absorber of a second embodiment.

As illustrated in FIG. 4, similarly to the shock absorber D in the first embodiment, the shock absorber D1 in the second embodiment is configured to include: a shock absorber main body 1 in which an outer tube 2 having a screw portion 2a on its outer periphery and a rod 3 to be inserted into the outer tube 2 so as to be movable in the axial direction are included; a suspension spring 4 formed of a coil spring disposed on the outer periphery of the shock absorber main body 1; a rod-side spring seat 5 attached to the rod 3 and supporting one end 4a of the suspension spring 4; an annular tube-side spring seat 12 screwed to the screw portion 2a of the outer tube 2 and supporting the other end 4b of the suspension spring 4; a slider 11 to be placed on the outer periphery of the outer tube 2 with only an axial movement is permitted; and a connecting portion that detachably connects the tube-side spring seat 12 to the slider 11; and a rotation regulating portion that regulates a rotation of the tube-side spring seat 12 and the slider 11 relative to each other about the axis of the outer tube 2 in a state where the tube-side spring seat 12 and the slider 11 are connected to each other. Furthermore, similarly to the shock absorber D in the first embodiment, the shock absorber D1 is used with being interposed between the vehicle body and the rear wheel in a straddle vehicle (not illustrated), and reduces vibrations of the vehicle body and the rear wheel.

The shock absorber D1 of the second embodiment is different from the shock absorber D of the first embodiment in the structures of the slider 11, of the tube-side spring seat 12, and of the connecting portion connecting them. Note that the shock absorber D1 of the second embodiment is not different from the shock absorber D of the first embodiment in the configuration of the shock absorber main body 1.

Hereinafter, there will be described in detail the slider 11, the tube-side spring seat 12, and the connecting portion connecting them in the shock absorber D1 of the second embodiment, which are different from those in the shock absorber D of the first embodiment.

Figure 5:
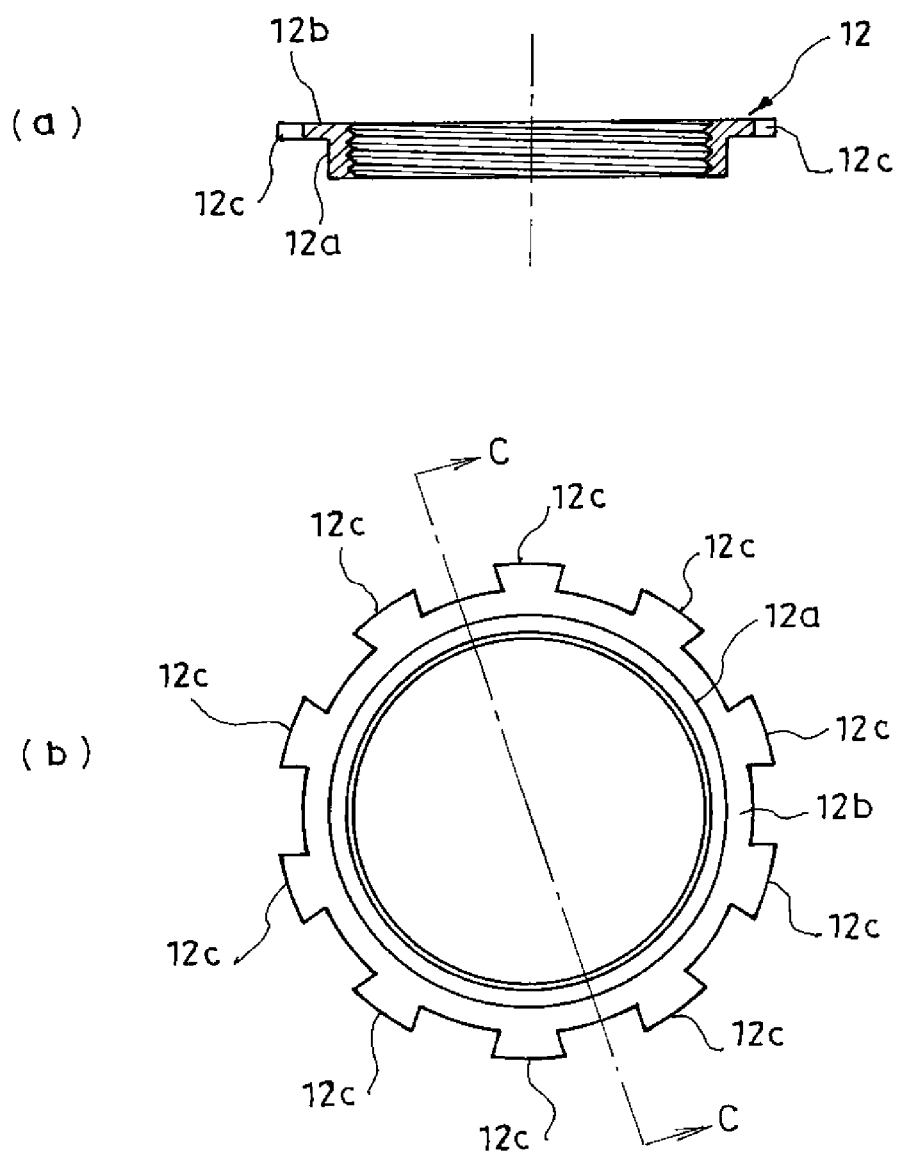
FIG. 5(a) is a cross-sectional view taken along line C-C of a tube-side spring seat of a shock absorber in a second embodiment.
FIG. 5(b) is a plan view of a tube-side spring seat of a shock absorber in a second embodiment.

An annular tube-side spring seat 12 is screwed to the screw portion 2a of the outer tube 2. The tube-side spring seat 12 is formed of a magnetic body and includes: a main body 12a having female screw formed on its inner periphery as illustrated in FIG. 5; an annular flange 12b protruding outward from the upper end of the outer periphery of the main body 12a in FIG. 4; and ten protrusions 12c provided at equal intervals in the peripheral direction on the outer periphery of the flange 12b and protruding radially outward.

A portion below the flange 12b of the main body 12a of the tube-side spring seat 12 in FIG. 5(a) functions as a fitting portion to which the end turn portion provided at the other end 4b of the suspension spring 4 is fitted. Once the other end 4b of the suspension spring 4 is fitted to the fitting portion of the main body 12a, the end turn portion of the other end 4b of the suspension spring 4 comes in contact with the lower end of the flange 12b in FIG. 5 (a), and the tube-side spring seat 12 bears the other end 4b of the suspension spring 4 at the flange 12b. In the shock absorber D1 of the second embodiment, ten protrusions 12c are provided on the outer periphery of the flange 12b at equal intervals with a phase difference of 36 degrees in the peripheral direction. As illustrated in FIG. 5(b), the protrusion 12c has a shape of circular sector in a plan view.

Figure 6:
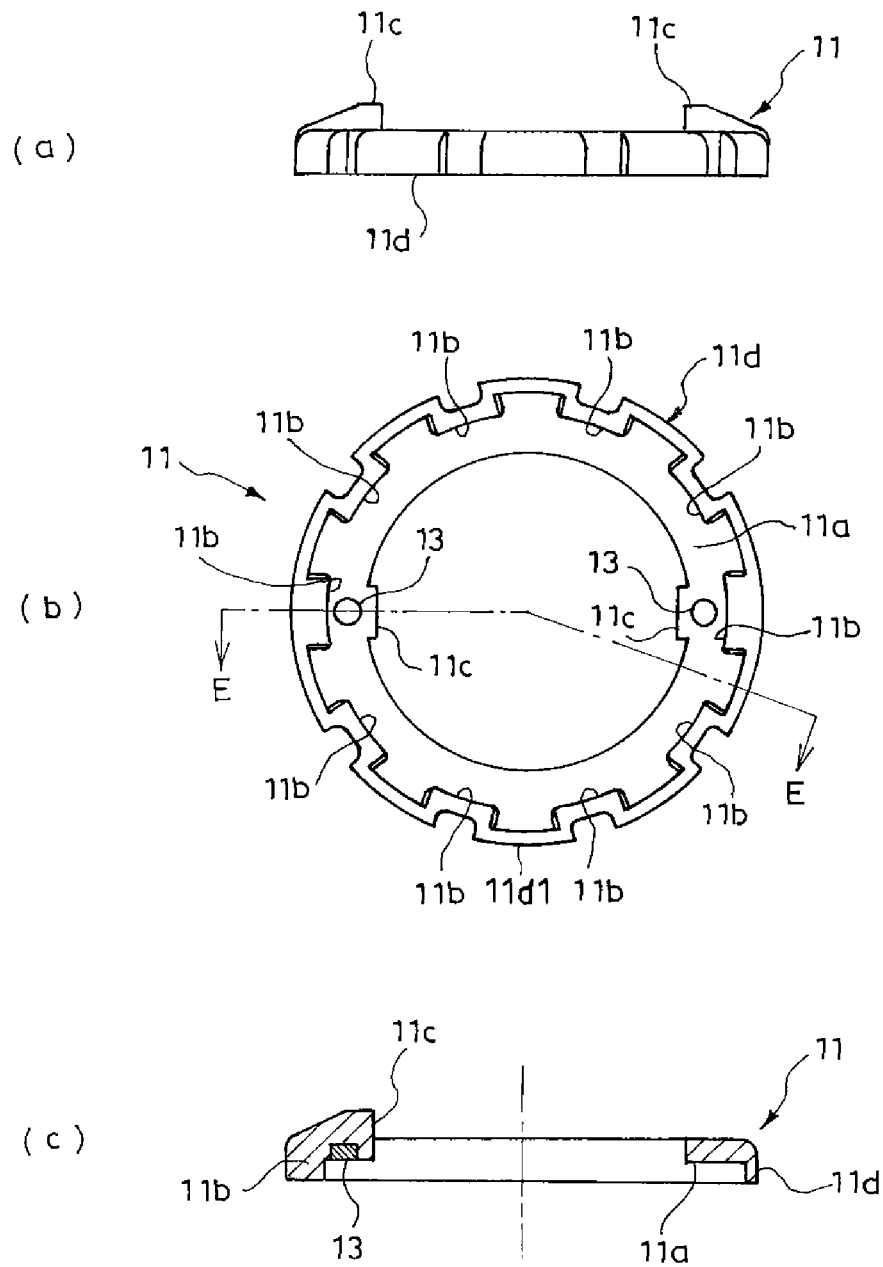
FIG. 6(a) is a side view of a slider of a shock absorber in a second embodiment.
FIG. 6(b) is a bottom view of a slider of a shock absorber in a second embodiment.
FIG. 6(c) is a cross-sectional view taken along line E-E of a slider of a shock absorber in a second embodiment.

As illustrated in FIG. 6, the slider 11 has an annular shape and includes: a main body 11a axially facing the upper surface of the flange 12b of the tube-side spring seat 12 in FIG. 4; ten fitting protrusions 11b provided on the main body 11a at equal intervals in the peripheral direction; keys 11c each provided at positions on the inner periphery of the main body 11a corresponding to the two key grooves 2e of the outer tube 2 so as to be inserted into each of the key grooves 2e; and a cover 11d continuous with the outer periphery of the main body 11a and covering a space between the fitting protrusions 11b and 11b.

The slider 11 is made of a synthetic resin. The slider 11 is not required to have strength as high as that is required for the tube-side spring seat 12 that is directly subjected to a load from the suspension spring 4, and hence the use of a synthetic resin reinforced by a glass fiber composite is not required. For this reason, also in the shock absorber D1 of the second embodiment, the slider 11 is configured to be made of a polyacetal resin but may be made of another synthetic resin. In addition, since the slider 11 is configured to be made of a synthetic resin, it contributes to the weight reduction of the shock absorber D1. Note that, the slider 11 may be made of a metal instead of a synthetic resin.

The slider 11 includes ten fitting protrusions 11b as many as the convex portions 12c of the tube-side spring seat 12. More specifically, the fitting protrusions 11b are provided on the main body 11a with a phase difference of 36 degrees at equal intervals in the peripheral direction, and protrude from the main body 11a toward the tube-side spring seat 12. Therefore, at the time when the main body 11a of the slider 11 abuts on the flange 12b of the tube-side spring seat 12, each fitting protrusion 11b enters and fits into a space between the convex portion 12c and convex portion 12c adjacent each other of the tube-side spring seat 12. As illustrated in FIG. 6(b), the fitting protrusion 11b has a shape of circular sector in a plan view, and is fitted into a space between the convex portion 12c and convex portion 12c adjacent each other of the tube-side spring seat 12 with the end surface facing the circumferential end surface of the convex portion 12c. Therefore, when the main body 11a of the slider 11 abuts on the flange 12b of the tube-side spring seat 12, the fitting protrusion 11b of the slider 11 and the convex portion 12c of the tube-side spring seat 12 are engaged with each other, and the slider 11 and the tube-side spring seat 12 are prevented from rotating relative to each other about the axis. Note that the shapes of the fitting protrusion 11b and of the protrusion 12c in a plan view are not limited to the illustrated shapes as long as they can be engaged with each other and the rotation of the slider 11 and the tube-side spring seat 12 relative to each other can be prevented.

The key 11c provided on the inner periphery of the main body 11a of the slider 11 protrudes radially inward with a phase difference of 180 degrees in the peripheral direction with respect to the main body 11a. The keys 11c are provided as many as the key grooves 2e in accordance with the installed number of key grooves 2e provided in the outer tube 2. Note that, the installed number of the keys 11c is required to be the same as the installed number of the key grooves 2e of the outer tube 2.

The slider 11 is placed on the outer periphery of the outer tube 2 by inserting the outer tube 2 into the inner periphery from the lower end side of the outer tube 2 in FIG. 4, while aligning the position of the key 11c on the inner periphery with the position of the key groove 2e provided on the outer periphery of the outer tube 2 in the peripheral direction. Once the key 11c is fitted into the key groove 2e, the side walls of the key 11c are slidably in contact with both side walls of the key groove 2e, and the movement of the slider 11 in the peripheral direction of the outer tube 2 is regulated, but the movement of the slider 11 in the axial direction along the key groove 2e of the outer tube 2 is permitted. Therefore, the slider 11 is placed on the outer periphery of the outer tube 2 in a state where only the movement in the axial direction is permitted by the key 11c and the key groove 2e. Note that, the prevention of the rotation and the permission of the axial movement of the slider 11 relative to the outer tube 2 are realized by the key 11c and the key groove 2e, however, they may be realized by other structures. Therefore, also in the shock absorber D1 of the second embodiment, the outer peripheral shape of the outer tube 2 may be made to be a shape obtained by linearly cutting off a part of a circle in such a way that the inner peripheral shape of the slider 11 is a shape matching the outer peripheral shape of the outer tube 2, thereby realizing the prevention of the rotation and the permission of the axial movement of the slider 11 relative to the outer tube 2.

After the slider 11 is placed on the outer tube 2 in this manner, the tube-side spring seat 12 is screwed to the screw portion 2a of the outer tube 2 by inserting the outer tube 2 into the inner periphery from the lower end side of the outer tube 2 in FIG. 4. In a state where the tube-side spring seat 12 is screwed to the screw portion 2a, the slider 11 cannot move to the opposite side of the tube-side spring seat 12 across the tube-side spring seat 12 and the key groove 2e is formed only partway in the outer tube 2, so that the slider 11 does not fall off from the outer tube 2.

The slider 11 includes the cover 11d that is continuous with the outer periphery of the main body 11a and covers a space between the fitting protrusions 11b. The cover 11d has an annular shape and rises up from the outer periphery of the main body 11a toward the tube-side spring seat 12, has a corrugated shape having rectangular grooves and ridges in the peripheral direction, is integrated into the outer periphery of the fitting protrusion 11b, and covers a space between the fitting protrusions 11b and 11b as viewing the slider 11 from the side. In FIG. 6(c), the axial depth of the cover 11d from the lowermost end to the main body 11a is set to be shorter than the axial length of the convex portion 12c, and in a state where the main body 11a of the slider 11 abuts on the flange 12b of the tube-side spring seat 12 and the fitting protrusion 11b is fitted into a space between the convex portions 12c and 12c, the convex portion 12c and the flange 12b slightly protrude outward from the lower end of the cover 11d. Therefore, even when the tube-side spring seat 12 is fitted to the slider 11, the suspension spring 4 and the slider 11 do not interfere with each other.

The inner peripheral shapes of the cover 11d and the fitting protrusion 11b of the slider 11 are formed in shapes conforming to the outer peripheral shapes of the flange 12b and the protrusion 12c of the tube-side spring seat 12, and once the tube-side spring seat 12 is put on the slider 11, the protrusion 12c and the flange 12b are fitted and accommodated into the inner peripheries of the cover 11b and the fitting protrusion 11b of the slider 11.

Here, as stated previously, the circumferential rotation of the slider 11 relative to the outer tube 2 is regulated, and once the fitting protrusion 11b of the slider 11 is fitted into a space between the protrusions 12c and 12c of the tube-side spring seat 12 thereby bringing the tube-side spring seat 12 into contact with the slider 11, the rotation of the slider 11 relative to the tube-side spring seat 12 is regulated. For this reason, once the tube-side spring seat 12 is fitted to the slider 11 that is placed on the outer tube 2, the circumferential rotation of the tube-side spring seat 12 relative to the outer tube 2 is regulated.

Note that, in the shock absorber D1 of the second embodiment, the slider-side facing portion of the slider 11 that faces the tube-side spring seat 12 is configured as the main body 11a and the fitting protrusion 11b, and the spring seat-side facing portion of the tube-side spring seat 12 that faces the slider 11 is configured as the flange 12b and the protrusion 12c.

In the shock absorber D1 of the second embodiment, the rotation regulating portion is configured with: the fitting protrusion 11b which is the spring seat-side facing portion; and the convex portion 12c which is the slider-side facing portion. According to the shock absorber D1 of the second embodiment, when the tube-side spring seat 12 is pulled out from the slider 11 and rotated, and the tube-side spring seat 12 is put into the slider 11 again with the fitting protrusion 11b being fitted into a space between the convex portions 12c and 12c, the positions of the slider 11 and the tube-side spring seat 12 relative to each other in the peripheral direction can be changed in a state where the rotation of the slider 11 and the tube-side spring seat 12 relative to each other is regulated. In this example, ten fitting protrusions 11b and ten convex portions 12c are provided, and hence the tube-side spring seat 12 can be positioned in a state where the rotation relative to the slider 11 is regulated to ten positions that are different from each other by 36 degrees in the peripheral direction. Note that the installed number of the fitting protrusions 11b provided on the slider 11 side and the installed number of the protrusions 12c of the tube-side spring seat 12 are not necessarily to be the same as each other as long as the tube-side spring seat 12 and the slider 11 can be moved relative to each other in the axial direction of the outer tube 2 so that the slider 11 can be fitted in and pulled out from the tube-side spring seat 12. However, in the shock absorber D1 of the present embodiment in which the slider 11 is formed of a synthetic resin, since the rotation regulating portion is configured with the fitting protrusion 11b and the protrusion 12c, it is preferable to provide the fitting protrusion 11b and the protrusion 12c in the same number in view of improving the strength of the rotation regulating portion against a torque for rotating the slider 11 and the tube-side spring seat 12 relative to each other.

The outer peripheral shape of the slider 11 is configured to have a corrugated shape with the outward protrusion of a portion 11d1 corresponding to a space between the fitting protrusions 11b and 11b into which the convex portion 12c is fitted in the peripheral direction of the cover 11d. Therefore, an operator adjusting the vehicle height of a straddle vehicle can visually recognize the portion 11d1 protruding outward as a mark when viewing the slider 11 from the outside. Once the position of the portion 11d1 and the position of the convex portion 12c are aligned in the peripheral direction, the tube-side spring seat 12 can be inserted into the slider 11, and hence, the operator can align the slider 11 and the tube-side spring seat 12 in the peripheral direction using the portion 11d1 as a mark when fitting the tube-side spring seat 12 pulled out from the slider 11 into the slider 7 again. The operator can easily fit the fitting protrusion 11b, which cannot be visually recognized from the outer peripheral side of the slider 11, into a space between the convex portions 12c and 12c so that the tube-side spring seat 12 can be fitted into the slider 11. Note that, the mark is configured as the portion 11d1 in the shock absorber D1 of the second embodiment, but the mark may be formed by a protrusion or another shape or may be formed by painting as long as the operator can visually recognize it. In addition, in a case where the cover 11d is not provided on the slider 11, there is no need to install a mark since the fitting protrusion 11b can be visually observed.

Furthermore, the slider 11 includes a magnet 13 that attracts the tube-side spring seat 12 at the time when the tube-side spring seat 12 abuts on the main body 11a. In the shock absorber D1 of the second embodiment, the magnets 13 each are provided in the main body 11a in an area located radially outside the key 11c. That is, two magnets 13 as many as the keys 11c are provided with being embedded in the main body 11a of the slider 11. A portion of the main body 11a facing the radially outer side of the key 11c has a large width in the radial direction because of the provision of the key 11c, and hence there is an advantage that the strength of the main body 11a is less likely to be reduced even if the magnet 13 is embedded in this portion. In the shock absorber D1 of the present embodiment, the installed number of the magnets 13 is configured to be the same as the number of the keys 11c, however, the installed number of the magnets 13 may be smaller than the number of the keys 11c provided on the slider 11 as long as at least one magnet 13 is installed, and a decrease in strength of the slider 11 is less likely to be caused as long as the magnets are installed at positions corresponding to the keys 11c of the slider 11. The installed number of the keys 11c provided on the slider 11 is one or more and may be smaller than the installed number of the key grooves 2e of the outer tube 2. Therefore, in a case where the magnet 13 is installed with being embedded in the main body 11a, the magnet 13 is preferably provided at the radially outside the key 11c of the main body 11a, but the installation position of the magnet 13 in the flange slider 11 is not limited to the above-mentioned area of the main body 11a.

In the shock absorber D1 of the second embodiment, the magnet 13 is configured as a neodymium magnet which is a permanent magnet excellent in attraction force (magnetic force), however, the magnet may be a permanent magnet other than the neodymium magnet as long as the magnet is a permanent magnet that attracts the tube-side spring seat 12 at the time when the flange 12b of the tube-side spring seat 12 is brought into contact with the main body 11a of the slider 11 and exerts attraction force (magnetic force) to such an extent that the slider 11 does not fall off from the tube-side spring seat 12 due to vibrations input during the traveling of a straddle vehicle. Note that, the magnet 13 is bonded to the slider 11 with an adhesive interposed in a hole formed in the main body 11a, however, the use of an adhesive is not needed in a case where the magnet 13 is fitted into and firmly held in the slider 11 without falling off since the slider 11 is made of a synthetic resin which has elasticity. The magnitude of the coupling strength between the slider 11 and the tube-side spring seat 12 can be adjusted by setting the magnetic force of the magnet 13, but the position of the end face of the magnet 13 facing toward the tube-side spring seat 12 side can be adjusted by setting the depth of the hole in the main body 11a of the slider 11, and hence the magnitude of the coupling strength can also be adjusted by setting the depth of the hole. In addition, although the installed number of the magnets 13 can be freely set as long as an adequate joining strength can be ensured to such an extent that the slider 11 does not fall off from the tube-side spring seat 12, when a plurality of magnets is arranged in the slider 11 at equal intervals in the peripheral direction, the tube-side spring seat 12 can be attracted in the peripheral direction in a well-balanced manner.

Once the tube-side spring seat 12 is fitted to the slider 11 as stated previously, the magnet 13 attached to the slider 11 attracts the tube-side spring seat 12, whereby the slider 11 is connected to the tube-side spring seat 12 in a state where the tube-side spring seat 12 and the slider 11 are fitted to each other.

Once the slider 11 and the tube-side spring seat 12 are connected to each other, the fitting protrusion 11b is fitted into a space between the convex portions 12c and 12c, whereby the fitting protrusion 11b and the convex portion 12c are mated, and the rotation of the tube-side spring seat 12 is regulated relative to the slider 11 whose rotation relative to the outer tube 2 is regulated. As a result, the circumferential rotation of the tube-side spring seat 12 relative to the outer tube 2 is regulated. Therefore, even if the tube-side spring seat 12 is subjected to a torque from the suspension spring 4 in the motion of extension or compression of the suspension spring 4, the tube-side spring seat 12 does not rotate relative to the outer tube 2 in a state where the tube-side spring seat 12 and the slider 11 are connected to each other, and thus the tube-side spring seat 12 does not move in the axial direction relative to the outer tube 2.

As described above, in the shock absorber D1 of the second embodiment, the connecting portion is configured with the magnet 13 attached to the slider 11 and the tube-side spring seat 12 made of a magnetic body, and the connecting portion detachably connects the slider 11 to the tube-side spring seat 12. Alternatively, the tube-side spring seat 12 is provided with a magnet, and the slider 11 may be made of a magnetic body, or the slider 11 may include a magnetic body at a portion facing the magnet. In a case where the outer tube 2 is made of a magnetic body, when the slider 11 not experiencing a large load and/or torque is made of a synthetic resin and the magnet 13 is held in the slider 11, the slider 11 is not magnetized by the magnet 13, so that the slider 11 can move smoothly in the axial direction relative to the outer tube 2. Alternatively, instead that the entirety of the tube-side spring seat 12 is made of a magnetic body, an annular magnetic body may be attached to a portion of the flange 12b facing the magnet 13 over the entire circumference of the flange 12b. Furthermore, in a case where the magnet 13 is provided in the tube-side spring seat 12, when the tube-side spring seat 12 is made of a glass fiber-reinforced polyamide-based resin having high strength, there is no hindrance of the rotating operation due to the overall magnetization, even when the outer tube 2 is made of a magnetic body. Even in a case where the magnet 13 is provided in the tube-side spring seat 12, the installation position and the installed number of the magnets 13 can be freely set as long as the coupling strength between the slider 11 and the tube-side spring seat 12 can be ensured.

The shock absorber D1 is configured as described above, and when the shock absorber D1 is interposed between the vehicle body and the rear wheel of a straddle vehicle, as stated previously, the shock absorber D1 elastically supports the vehicle body by the resilient force of the suspension spring 4 thereby reducing the transmission of vibrations input from the rear wheel side to the vehicle body during the traveling of the straddle vehicle, and attenuating the vibration of the vehicle body by the virtue of the damping force generated by the shock absorber main body 1, so that the vibration of the vehicle body is reduced.

According to this shock absorber D1, an operator can adjust the vehicle height, which is the height of the vehicle body of a straddle vehicle, by the following procedure. First, from a state in which the tube-side spring seat 12 is fitted to the slider 11 and the magnet 13 provided on the slider 11 and the tube-side spring seat 12 made of a magnetic body which are serving as the connecting portion attract each other whereby the slider 11 and the tube-side spring seat 12 are connected to each other, the operator grips the slider 11 with one hand and grips the tube-side spring seat 12 or the outer tube 2 with the other hand and pushes the slider 11 upward in the axial direction to separate the slider 11 away from the tube-side spring seat 12. Hereupon, the tube-side spring seat 12 can be pulled out from the slider 11, and the tube-side spring seat 12 is brought into a state of being circumferentially rotatable relative to the outer tube 2.

Next, the operator rotates the tube-side spring seat 12 in a desired direction in the peripheral direction relative to the outer tube 2 thereby moving the tube-side spring seat 12 relative to the outer tube 2 in the axial direction just like a feed screw, and stops the rotation of the tube-side spring seat 12 once the tube-side spring seat 12 can be arranged at a desired position. Furthermore, the operator aligns the position of the tube-side spring seat 12 in the peripheral direction so as to be in the position where the fitting protrusion 11b of the slider 11 is fitted into a space between the convex portions 12c and 12c of the tube-side spring seat 12 with the aid of a mark of the grooves and ridges on the outer periphery of the cover 11d of the slider 11.

Thereafter, in this state, the operator moves the slider 11 downward in FIG. 4 toward the tube-side spring seat 12 thereby fitting the tube-side spring seat 12 into the slider 11. Thereupon, the magnet 13 provided on the slider 11 attracts the tube-side spring seat 12, whereby the slider 11 is connected to the tube-side spring seat 12 in a state where the fitting protrusion 11b is fitted into a space between the convex portions 12c and 12c.

The tube-side spring seat 12 is connected to the slider 11 so as not to be circumferentially rotatable relative to the slider 11 whose circumferential rotation relative to the outer tube 2 is regulated. Therefore, once the tube-side spring seat 12 is connected to the slider 11 in this manner, the circumferential rotation of the tube-side spring seat 12 relative to the outer tube 2 is regulated, so that the tube-side spring seat 12 is fixed to the outer tube 2 in a state of being not movable in the axial direction. Note that since the convex portions 12c are provided on the outer periphery of the flange 12b of the tube-side spring seat 12 side by side in the peripheral direction, and the outer periphery of the cover 11d of the slider 11 is provided with grooves and ridges, when the operator grips the tube-side spring seat 12 and the slider 11, the outer peripheries of the convex portion 12c and the cover 11d play a role of slip prevention, thereby alleviating the burden imposed on the operator who is adjusting the height of the vehicle.

In this manner, the operator can separate the slider 11 from the tube-side spring seat 12 without using tools, adjust the position of the tube-side spring seat 12 in the axial direction with respect to the outer tube 2, and then connect the slider 11 to the tube-side spring seat 12 without using tools.

In addition, the operator does not need to perform such an operation of tightening a locknut using a screw driver and a hammer to apply a torque to the tube-side spring seat 12, and hence there is also solved the problem in which the tube-side spring seat 12 is unintentionally rotated in fixing the tube-side spring seat 12 to the outer tube 2 and the vehicle height cannot be adjusted as intended.

Figure 7:
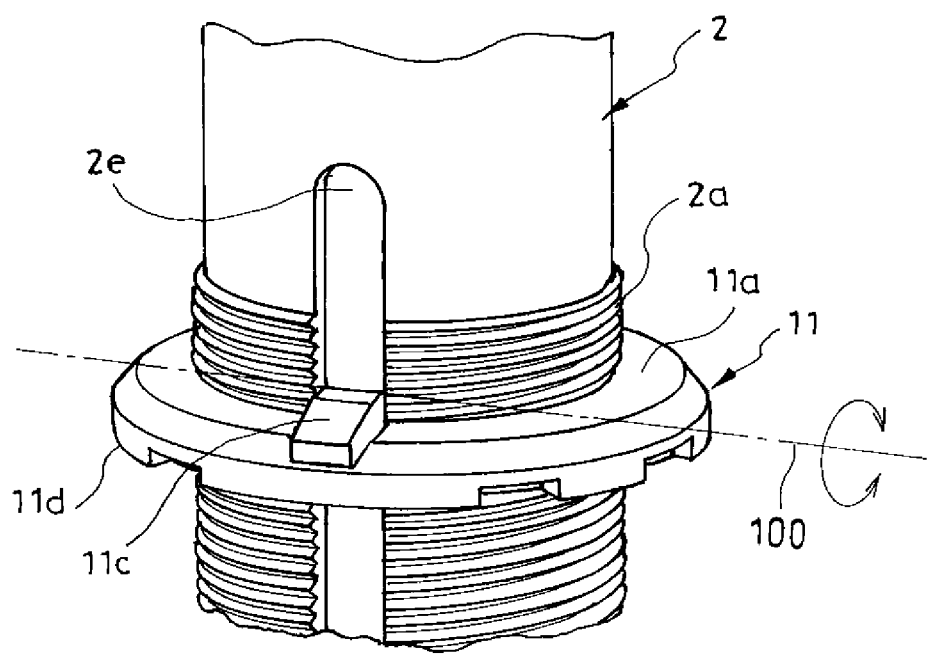
FIG. 7 is a perspective view of a slider and a part of an outer tube in a shock absorber of a second embodiment.

Note that, as stated previously, the magnet 13 is attached to the main body 11a of the slider 11 in an area where the key 11c to be fitted into the key groove 2e of the outer tube 2 is provided in the peripheral direction. The key 11c is inserted into the key groove 2e and the slider 11 is regulated from the circumferential rotation relative to the outer tube 2, but the slider 11 is not regulated from the movement in the axial direction. Since the slider 11 is loosely fitted to the outer periphery of the outer tube 2 so as to be movable in the axial direction relative to the outer tube 2 and there is some backlash, and as illustrated in FIG. 7, the slider can be rotated in a direction indicated by an arrow in FIG. 7 slightly around an axis 100 orthogonal to the plane which includes the axis line of the outer tube 2 and the center of the key groove 2e in the peripheral direction (width direction) and is along the axis line, so that the slider 11 can take a posture slightly inclined relative to the outer tube 2. Therefore, when detaching the slider 11 from the tube-side spring seat 12, the operator can perform such an operation of lifting up one side of the slider 11 on the side facing one of the keys 11c relative to the outer tube 2, thereby first separating one of the two magnets 13 away from the tube-side spring seat 12 to weaken the coupling strength between the slider 11 and the tube-side spring seat 12, and subsequently separating the other of the magnets 13 away from the tube-side spring seat 12.

Hence, the magnets 13 can be detached one by one from the tube-side spring seat 12 in detaching the slider 11 from the tube-side spring seat 12 in a case of providing two key grooves 2e on the outer periphery of the outer tube 2 along the axial direction with a phase difference of 180 degrees in the peripheral direction, providing two keys 11c, each of which to be inserted into each of the key grooves 2e, on the inner periphery of the slider 11 in correspondence with the two key grooves 2e, and providing the connecting portion with two magnets 13 installed in the main body 11a of the slider 11 at the radially outside the corresponding key 11c in correspondence with the two keys 11c. Therefore, in this case, as compared with the case where the tube-side spring seat 12 is detached from the two magnets 13 at the same time, the work load imposed on the operator can be mitigated in the detachment work of the tube-side spring seat 12 from the slider 11.

As described above, the shock absorber D1 of the second embodiment is configured to include: the shock absorber main body 1 in which the outer tube 2 having the screw portion 2a on the outer periphery and the rod 3 to be inserted into the outer tube 2 so as to be movable in the axial direction are included; the suspension spring 4 which is formed of a coil spring disposed on the outer periphery of the shock absorber main body 1; the rod-side spring seat 5 which is attached to the rod 3 and supports the one end 4a of the suspension spring 4; the annular tube-side spring seat 12 which is screwed to the screw portion 2a of the outer tube 2 and supports the other end 4b of the suspension spring 4; the slider 11 which is to be placed on the outer periphery of the outer tube 2 with only an axial movement is permitted; and the connecting portion (the magnet 13 and the tube-side spring seat 12) that detachably connects the tube-side spring seat 12 to the slider 11; and the rotation regulating portion (the convex portion 12c and the fitting protrusion 11b) which regulates a rotation of the tube-side spring seat 12 and the slider 11 relative to each other about the axis of the outer tube 2 in a state where the tube-side spring seat 12 and the slider 11 are connected to each other.

According to the shock absorber D1 configured as described above, an operator can attach and detach the tube-side spring seat 12 from the slider 11 without using a tool, and once the tube-side spring seat 12 is connected to the slider 11 by the aid of the connecting portion, a rotation of the tube-side spring seat 12 and the slider 11 relative to each other is regulated by the aid of the rotation regulating portion, so that there is no need to apply a torque for fixing the tube-side spring seat 12 to the outer tube 2. Therefore, according to the shock absorber D1 configured as described above, the vehicle height of a straddle vehicle can be adjusted as intended by the operator without using tools.

It should be noted that the slider 11 is required to be placed on the outer tube 2 in such a manner that a rotation relative to the outer tube 2 is regulated and only an axial movement is permitted, is required to be able to be connected to the tube-side spring seat 12 by the connecting portion, and is required to be able to be regulated by the rotation regulating portion from a rotation relative to the tube-side spring seat 12 about the axis of the outer tube 2. Hence, the slider 11 is configured to have an annular shape in the second embodiment, but is not needed to have an annular shape.

In the shock absorber D1 of the second embodiment, the tube-side spring seat 12 includes an annular flange (spring seat-side facing portion) 12b that faces the slider 11 in a state where the tube-side spring seat 12 is connected to the slider 11, the slider 11 has an annular shape and includes an annular main body (slider-side facing portion) 11a that faces the tube-side spring seat 12 in a state where the slider 11 is connected to the tube-side spring seat 12, and the rotation regulating portion includes: a plurality of convex portions 12c provided at equal intervals in the peripheral direction on the flange (spring seat-side facing portion) 12b; and fitting protrusions 11b provided on the main body (slider-side facing portion) 11a and to be fitted to the convex portions 12c, the number of the fitting protrusions 11b being less than or equal to the installed number of the convex portions 12c. According to the shock absorber D2 configured as described above, since the plurality of convex portions 12c is provided, by shifting the position of the fitting protrusion 11b to be fitted to the convex portion 12c, the position of the tube-side spring seat 12 relative to the slider 11 in the peripheral direction can be changed in accordance with the installed number of the protrusions 12c. Therefore, according to the shock absorber D2 configured as described above, since the tube-side spring seat 12 can be positioned at a plurality of positions in the peripheral direction relative to the outer tube 2, the vehicle height can be easily adjusted in multiple stages. Although the tube-side spring seat 12 is fitted into the slider 11, there may be adopted a structure in which a part of the slider 11 is fitted into the tube-side spring seat 12.

Furthermore, in the shock absorber D1 of the second embodiment, the tube-side spring seat 12 is configured as a magnetic body, and the connecting portion is configured to include a magnet 13 that is provided in the slider 11 and attracts the tube-side spring seat 12. According to the shock absorber D1 configured as described above, the slider 11 and the tube-side spring seat 12 are connected to each other by using the magnetic force of the magnet 13 that attracts the magnetic body, and hence the structure of the connecting portion is simplified, and the connecting portion is less likely to deteriorate even if the attachment and detachment of the tube-side spring seat 12 to and from the slider 11 are repeated, so that the performance can be maintained and exerted over a long period of time.

Note that, as stated previously, the connecting portion may be configured with: a magnet provided on the tube-side spring seat 12; and a slider 11 made of a magnetic body or a magnetic body provided on the slider 11 at a portion facing the magnet. Furthermore, instead that the entirety of the tube-side spring seat 12 is made of a magnetic body, an annular magnetic body may be attached to a portion of the flange 12b facing the magnet 13 over the entire circumference of the flange 12b.

In the shock absorber D1 of the second embodiment, the tube-side spring seat 12 is configured to include a plurality of convex portions 12c installed at equal intervals in the peripheral direction and radially protruding outward, and the slider 11 is configured to have an annular shape and to include: a plurality of fitting protrusions 11b installed at equal intervals in the peripheral direction and protruding toward the tube-side spring seat 12, the fitting protrusion 11b to be fitted in each space between the convex portions 12c and 12c when put on the tube-side spring seat 12; and a cover 11d that covers the outer peripheral sides of the convex portions 12c and 12c. According to the shock absorber D1 configured as described above, the cover 11d covers the fitting convex portion 11b of the slider 11 as well as the outer peripheral side of the convex portion 12c of the tube-side spring seat 12 into which the fitting convex portion 11b of the slider 11 is mated, and hence the entering of sand or mud into a space between the slider 11 and the tube-side spring seat 12 can be prevented. Furthermore, according to the shock absorber D1 configured as described above, there can be prevented the entering of sand or mud into the slider 11, into the tube-side spring seat 12 and into the abutment surface thereof, so that there can be effectively prevented the falling off of the slider 11 from the tube-side spring seat 12 due to a decrease in the attraction force of the magnet 13.

Furthermore, in the shock absorber D1 of the second embodiment, the outer tube 2 has a key groove 2e provided on the outer periphery along the axial direction, the slider 11 has an annular shape and includes a key 11c to be inserted into the key groove 2e on the inner periphery corresponding to the key groove 2e, the connecting portion includes a magnet 13 corresponding to the key 11c, and the magnet 13 corresponding to the key groove 2e is installed at a position corresponding to the key 11c of the slider 11. According to the shock absorber D1 configured as described above, the magnet 13 is installed at a position corresponding to the key 11c of the slider 11 with increased width in the radial direction because of the installation of the key 11c, so that there is an advantage that the strength of the slider 11 is less likely to decrease.

Furthermore, in the shock absorber D1 of the second embodiment, the outer tube 2 has two key grooves 2e and 2e formed on the outer periphery along the axial direction and provided with a phase difference of 180 degrees in the peripheral direction, the slider 11 has an annular shape and includes two keys 11c and 11c each to be inserted into each of the key grooves 2e and 2e on an inner periphery corresponding to the two key grooves 2e and 2e, the connecting portion includes two magnets 13 and 13 corresponding to the two keys 11c and 11c, and the magnet 13 corresponding to the key 2e is installed at radially outside the corresponding key 11c of the slider 11. According to the shock absorber D1 configured as described above, since the magnets 13 can be detached from the tube-side spring seat 12 one by one in detaching the slider 11 from the tube-side spring seat 12, the work load imposed on the operator can be reduced in the detachment work of the tube-side spring seat 12 from the slider 11.

Although the preferred embodiments of the present invention have been described above in detail, modifications, variations, and changes can be made thereto without departing from the scope of the claims.

The invention claimed is:

1. A shock absorber comprising:
   a shock absorber main body in which an outer tube having a screw portion on its outer periphery and a rod to be inserted into the outer tube so as to be movable in its axial direction are included;
   a suspension spring formed of a coil spring disposed on an outer periphery of the shock absorber main body;
   a rod-side spring seat that is attached to the rod and that supports one end of the suspension spring;
   an annular tube-side spring seat that is screwed to the screw portion of the outer tube and that supports another end of the suspension spring;
   a slider to be placed on an outer periphery of the outer tube with only a movement in the axial direction is permitted;
   a connecting portion that detachably connects the tube-side spring seat to the slider; and
   a rotation regulating portion that regulates a rotation of the tube-side spring seat and the slider relative to each other about an axis of the outer tube in a state where the tube-side spring seat and the slider are connected to each other.

2. The shock absorber according to claim 1, wherein
   the tube-side spring seat includes an annular spring seat-side facing portion that faces the slider in a state where the tube-side spring seat and the slider are connected to each other,
   the slider has an annular shape and includes an annular slider-side facing portion that faces the tube-side spring seat in a state where the slider and the tube-side spring seat are connected to each other, and
   the rotation regulating portion includes: a plurality of grooves provided on one of the spring seat-side facing portion and the slider-side facing portion at equal intervals in a peripheral direction; and protrusions that are provided on another one of the spring seat-side facing portion and the slider-side facing portion and are to be fitted into the grooves, the number of the protrusions being less than or equal to the installed number of the grooves.

3. The shock absorber according to claim 1, wherein
   the slider has an annular shape, and
   the connecting portion includes: an annular convex portion provided on an outer periphery of one of the tube-side spring seat and the slider along its peripheral direction; an elastic piece extending from another one of the tube-side spring seat and the slider; and a claw that is provided on a distal end side of the elastic piece and is to be caught in the annular convex portion.

4. The shock absorber according to claim 2, wherein
   the slider can be fitted into either an inner periphery or an outer periphery of the tube-side spring seat, and
   one of the tube-side spring seat and the slider that is disposed outside has a mark on its outer periphery at the same position as the groove or the protrusion formed thereon in its peripheral direction.

5. The shock absorber according to claim 1, wherein
   at least one of the tube-side spring seat and the slider is a magnetic body, and the connecting portion includes a magnet provided in another one of the tube-side spring seat and the slider so as to attract the one of the tube-side spring seat and the slider.

6. The shock absorber according to claim 5, wherein
the tube-side spring seat has a plurality of convex portions disposed at equal intervals in a peripheral direction and radially protruding outward, and
the slider has an annular shape and includes: a plurality of fitting protrusions installed at equal intervals in a peripheral direction and protruding toward the tube-side spring seat side, the fitting protrusions each being fitted into each space between the convex portions when the slider is put on the tube-side spring seat; and a cover that covers an outer peripheral side of the convex portion.

7. The shock absorber according to claim 5, wherein
the outer tube has a key groove provided on its outer periphery along its axial direction,
the slider has an annular shape and includes a key, which is to be inserted into the key groove, on its inner periphery corresponding to the key groove,
the connecting portion includes a magnet corresponding to the key, and
the magnet corresponding to the key is installed at a position of the slider corresponding to the key.

8. The shock absorber according to claim 5, wherein
the outer tube has two key grooves that are formed on its outer periphery along its axial direction and are provided with a phase difference of 180 degrees from each other in a peripheral direction,
the slider has an annular shape and includes two keys on its inner periphery corresponding to the two key grooves, each of the two keys being to be inserted into each of the key grooves,
the connecting portion includes two magnets corresponding to the two keys, and
the magnet corresponding to the key is installed radially outside the corresponding key of the slider.

9. The shock absorber according to claim 1, wherein
one or both of the tube-side spring seat and the slider are made of a synthetic resin.

* * * * *